Jan. 1, 1924
A. KUTCHERA
EXPANSIBLE REAMER
Filed Aug. 11, 1922
1,479,079
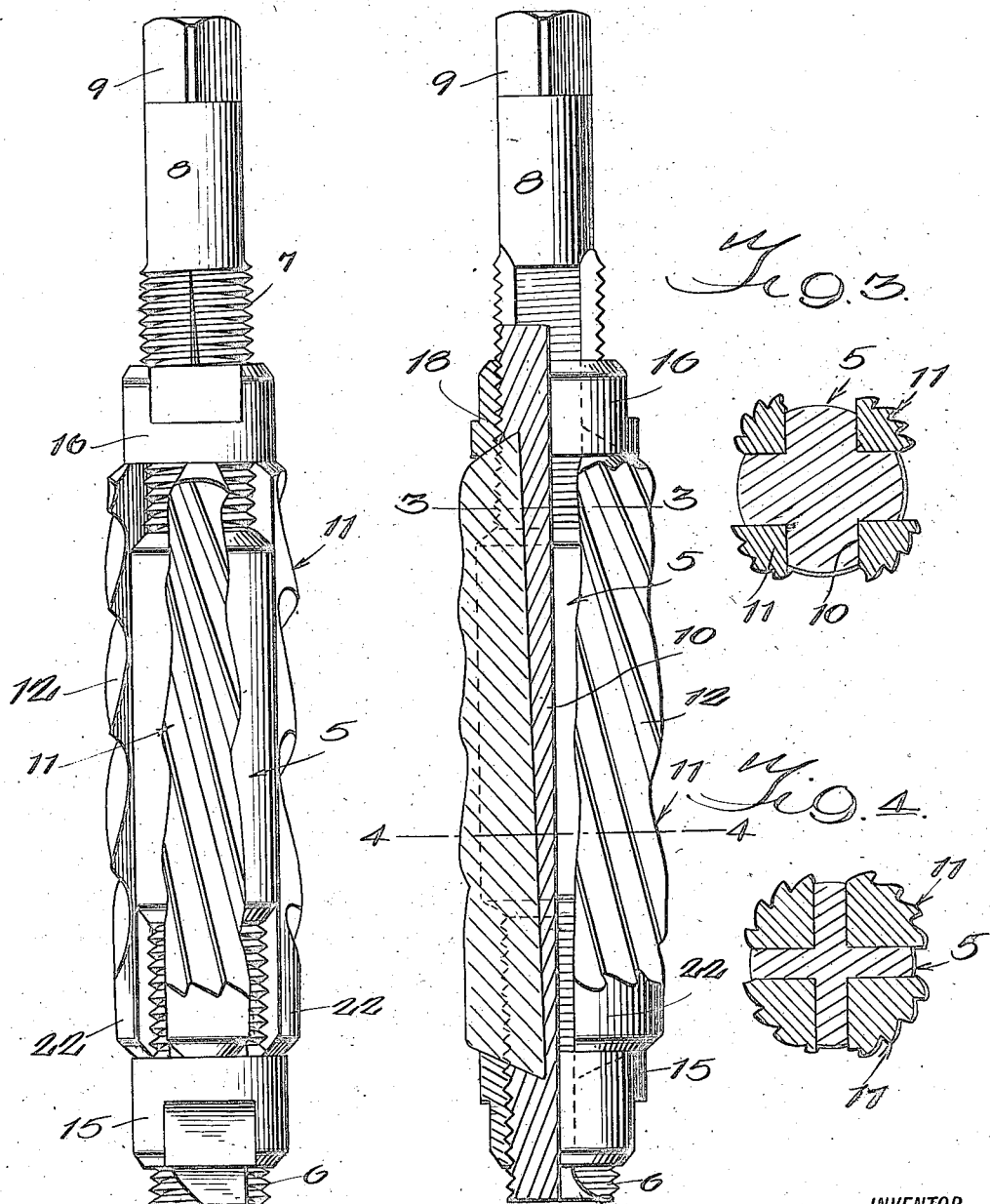
INVENTOR
A. KUTCHERA,
ATTORNEYS Patented Jan. 1, 1924.

1,479,079

UNITED STATES PATENT OFFICE.

ADOLF KUTCHERA, OF BISMARCK, NORTH DAKOTA.

EXPANSIBLE REAMER.

Application filed August 11, 1922. Serial No. 581,255.

*To all whom it may concern:*

Be it known that I, ADOLF KUTCHERA, a citizen of the United States, and a resident of Bismarck, in the county of Burleigh and State of North Dakota, have invented certain new and useful Improvements in Expansible Reamers, of which the following is a specification.

This invention relates to reamers of the expansible type.

Briefly stated, an important object of this invention is to provide an expansible reamer having a wide range of adjustment so that the same may be used in openings of various diameters.

The invention forming the subject matter of this application embodies a plurality of adjustable cutting blades or sections, the forward portions of which are exteriorly smooth and cooperate in the formation of a variable width pilot by means of which the movement of the reamer into an opening is guided.

By reason of the variable pilot at the forward portion of the reamer the tool is especially useful in reaming the wrist pin holes in old and worn pistons as the pilot will contact with the unworn part of the hole and thereby preventing the reamer from re-surfacing the wrist pin opening with the worn part of the hole as an axis.

A further object of the invention is to provide a reamer wherein the adjustable blades are arranged close together and are provided with a large number of cutting edges whereby in the use of the reamer chattering will not occur.

Also an object is to provide an expansible reamer which is durable, easy to keep clean and simple to adjust and take apart.

Other objects and advantages of the invention will be apparent during the course of the following description.

In the accompanying drawing, forming a part of this application, and in which like numerals are employed to designate like parts throughout the same, Figure 1 is a side elevation of the improved reamer.

Figure 2 is a similar view of the reamer, parts being shown in section.

Figure 3 is a sectional view taken on line 3—3 of Figure 2.

Figure 4 is a sectional view taken on line 4—4 of Figure 2.

In the drawing, the numeral 5 designates a spindle formed from any suitable material and having its forward portion screw threaded as indicated at 6 and its rear portion threaded as indicated at 7. A shank 8 is formed on the rear end of the spindle and is provided with suitable means indicated at 9 for connecting the reamer with a suitable turning member such as a cross handle, the intermediate portion of which is formed with an opening to receive the squared portion 9.

Figures 2, 3 and 4 illustrate that the spindle is provided with four longitudinally extending grooves which slidably and adjustably receive cutting blades 11. It might be stated that the grooves 10 are V-shaped in cross section and the blades 11 are of a similar formation so as to snugly fit within the grooves. However, it will be seen that the outer portions of the blades extend beyond the periphery of the spindle and are formed with spiral cutting edges 12 which engage the work in the usual manner.

Of course straight cutting edges may be employed in lieu of the spiral cutting edges 12.

The V-shaped grooves 10 are gradually and uniformly increased in depth toward the forward end of the reamer and the several blades are increased in cross sectional area toward their forward ends so that the greatest external diameter of the reamer will be substantially the same throughout. That is to say, the cross sectional area of the reamer at its forward portion or adjacent the forward ends of the spiral cutting portions will be substantially the same as the cross sectional area of the reamer at the rear ends of the blades whereby a hole of a uniform diameter throughout is provided.

The cutting blades 12 are adjustably held in position by means of nuts 15 and 16 threaded on the portions 6 and 7, respectively, and by adjusting the nuts either forwardly or rearwardly the position of the blades may be changed. If it is desired to expand the reamer the blades are moved rearwardly on the spindle and the nuts 15 and 16 are also moved. On the other hand if it is desired to decrease the cross sectional area of the reamer the blades are advanced so that the same will be received within the deep portions of the V-shaped grooves 10. It will be observed that the opposed sides of the nuts 15 are formed with annular recesses for the reception of the tapered ends 18 of the blades so that the accidental displacement of the blades is positively prevented.

Attention is directed to the fact that the forward portions of the blades 11 are exteriorly smooth to form a pilot by means of which the movement of the reamer is guided. That is to say the smooth outer faces 22 of the blades 11 cooperate in the formation of an expansible pilot which is at all times several thousandths of an inch smaller than the cutting portion of the reamer so as to effectively guide and crowd the reamer into the opening.

It will be observed that as the cross sectional area of the reamer is varied the cross sectional area of the pilot will also be varied and thereby automatically adjusted to the new condition.

This feature is especially advantageous in reaming the wrist pin openings in engine cylinders as the expansible pilot will contact with the unworn part of the opening and thereby properly guide the reamer so that the hole will be exactly at right angles to the longitudinal axis of the piston. When a wrist pin is in position in the piston it terminates short of the outer side of the piston and consequently only a part of each opening is worn and that portion of the opening which remains unworn is engaged by the expansible pilot.

In carrying out the invention the grooves may be made spiral and correspondingly formed blades may be provided in which case the curvature of the cutting edges might be changed slightly.

With reference to the foregoing description, taken in connection with the accompanying drawing, it will be seen that the improved reamer is capable of a wide range of adjustment for use under a wide variety of conditions and that the presence of the expansible pilot makes the reamer especially useful in re-working the wrist pin openings in a piston or other place.

What I claim is:

An expansible reamer comprising a spindle having grooves gradually increasing in depth toward the forward end of the spindle, blades received in said grooves and having their outer sides formed with cutting means, said blades and said grooves being V-shaped in cross section, and nuts threaded on said spindle and engaging opposite ends of said blades whereby to hold the blades in position and adjust them longitudinally in said grooves.

ADOLF KUTCHERA.